United States Patent [19]

Dubach

[11] Patent Number: 4,832,075

[45] Date of Patent: May 23, 1989

[54] ONE-WAY CHECK VALVE FOR PRESSURIZED FLUID

[75] Inventor: Roland Dubach, Cortaillod, Switzerland

[73] Assignee: Maret S.A., Bole, Switzerland

[21] Appl. No.: 199,599

[22] Filed: May 27, 1988

[30] Foreign Application Priority Data

Jan. 7, 1988 [CH] Switzerland .................. 41/88

[51] Int. Cl.⁴ .................................. F16K 15/04
[52] U.S. Cl. .................. 137/512; 137/533.11; 251/368
[58] Field of Search .............. 137/512, 533.11, 533.13, 137/533.15, 519.5; 251/368

[56] References Cited

U.S. PATENT DOCUMENTS

| | | | |
|---|---|---|---|
| 2,695,628 | 11/1954 | Wheildon | 251/368 X |
| 3,729,022 | 4/1973 | Roach | 137/533.15 |
| 4,246,002 | 1/1981 | Bell | 137/533.11 X |
| 4,282,897 | 8/1981 | Demay | 137/533.11 |

Primary Examiner—Robert G. Nilson

[57] ABSTRACT

A one-way check valve for pressurized fluid is described which comprises the following elements: a cylindrical envelope (1) provided with a chamber (2) having a fluid inlet passage (3) at its base and a fluid outlet passage (4) at its top end, a mobile sphere (5) which moves inside the chamber (2), under the effect of the pressure exerted by the fluid, from a closed position to an open position or vice-versa, and a ring (6) firmly fixed to the base of the envelope (1) and serving as a seat for the mobile sphere (5) in the closed position, the upper part (7) of the ring (6) being shaped so as to present a spherical or conical contact surface (8), the upper part of the chamber (2) having stops (9) separated by passages (10) leading into the fluid outlet passage (4), the lower part of each of the stops (9) being shaped so as to present a spherical or conical contact surface (11), and the mobile sphere (5) being retained by the said stops (9) in the open position, and the envelope (1), the mobile sphere (5) and the ring (6) being composed, in all three cases, of a dense polycrystalline or essentially polycrystalline inorganic material.

7 Claims, 1 Drawing Sheet

ONE-WAY CHECK VALVE FOR PRESSURIZED FLUID

SUMMARY OF THE INVENTION

The invention relates to a check valve for pressurized fluid which is used especially in high pressure liquid chromatography apparatuses.

BACKGROUND OF THE INVENTION

For high pressure liquid chromatography apparatuses, it is necessary to use a variety of devices which have to cope with numerous constraints such as high pressure (400 to 500 bar, or even 800 bar or more), corrosion under the action of the chemicals used (for example acidic or basic eluents) and perfect leaktightness at the various seals, for example. HPLC (High Pressure Liquid Chromatography) techniques have so far been very widely applied in biological or chemical analysis, for example in the analysis of amino acids. In such cases, there is a further constraint to add to those mentioned above, namely the biocompatibility of the various elements—pistons, valves, membranes, etc.—which are in contact with substances as sensitive as amino acids.

The constituent elements of HPLC apparatuses which have to safisfy such conditions include the one-way check valves located downstream and upstream of the pump feeding the apparatus with liquid under high pressure. The devices known at the present time consist essentially of a stainless steel sleeve in with tubular elements made of polymerized organic material are inserted or even crimped, the said elements being placed end-to-end in the sleeve. These elements create a hollow chamber in which a ball of appropriate size moves, the said ball being made of ruby in the most general case. The seat for the ball consists of a sapphire ring on which the ball rests when the device is in the closed position. At the opposite end of the chamber, there is an orifice whose mean diameter is substantially reduced compared with that of the chamber, the said orifice being arranged so that a certain amount of fluid can still pass through when the ball rests against this orifice (device in the open position).

In view of the various stresses described above, the elements of the device which are in contact with the fluid undergo relatively rapid degradation, which is further increased by the corrosive nature of some of the reagents used. Independently of the precautions taken, experience shows that it is not possible totally to avoid contact between reactive liquids and the inner face of the steel sleeve, in particular at the interface of the tubular elements placed end-to-end. For biolchemical analyses, traces of metals are therefore sufficient to interfere substantially with the result. Furthermore, in the devices which are being built at the present time, the use of polymeric organic material does not make it possible to obtain a geometry which favors the fluid flow, so these devices do not avoid the surges and turbulence which detract from the reliability of the system, in particular when HPLC techniques are used for analytical purposes.

THE INVENTION

The subject of the present invention makes it possible effectively to overcome the difficulties inherent in the devices known hitherto. The invention consists of a one-way check valve for pressurized fluid, comprising the following elements:

a cylindrical envelope (1) provided with a chamber (2) having a fluid inlet passage (3) at its base and a fluid outlet passage (4) at its top end, a mobile sphere (5) which moves inside the chamber (2), under the effect of the pressure exerted by the fluid, from a closed position to an open position or vice-versa, and a ring (6) firmly fixed to the base of the envelope (1) and serving as a seat for the mobile sphere (5) in the closed position, the upper part (7) of the ring (6) being shaped so as to present a spherical or conical contact surface (8), the upper part of the chamber (2) having stops (9) separated by passages (10) leading into the fluid outlet passage (4), the lower part of each of the stops (9) being shaped so as to present a spherical or conical contact surface (11), and the mobile sphere (5) being retained by the said stops (9) in the open position, and the envelope (1), the mobile sphere (5) and the ring (6) being composed, in all three cases, of a dense polycrystalline or essentially polycrystalline inorganic material.

Other subjects of the invention will become apparent on reading the text which follows.

PREFERRED EMBODIMENTS OF THE INVENTION

Figure 1:
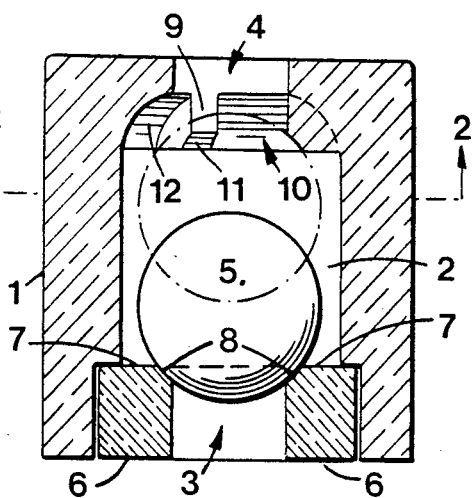
FIG. 1 illustrates, in axial section, a check valve according to one of the embodiments of the invention.

According to the invention, the check valve comprises a cylindrical envelope 1 provided with a chamber having a fluid inlet passage 3 at its base and a fluid outlet passage 4 at its top end. The terms "base" and "top end" use throughout the description can equally well be replaced by the terms "front part" and "rear part" since the operation of the check valve is not related to its position in space. The above terms simply make it easier to refer to the attached drawing.

A chamber 2 of cylindrical general shape, whose axis coincides with that of the envelope 1, is arranged inside the said envelope. A mobile sphere 5 moves inside the chamber 2, under the effect of the pressure exerted by the fluid, from a closed position to an open position or vice-versa, along the axis of the chamber.

The check valve also comprises a ring 6 firmly fixed to the base of the envelope 1 and serving as a seat for the mobile sphere 5 when the latter is located in the closed position, the upper part 7 of the ring 6 being shaped so as to present a spherical or conical contact surface 8; it will preferably be spherical. This special shape ensures total closure irrespective of the pressure prevailing inside the chamber 2. Moreover, premature wear of the mobile sphere 5 or its seat 6 is avoided since there is no edge contact.

According to the invention, the ring 6 is firmly fixed to the body of the envelope 1 and, after assembly, forms with the envelope a single piece enclosing the mobile sphere 5. The techniques for fixing the ring 6 firmly to the base of the envelope 1 will be described below.

One of the essential characteristics of the invention is the special arrangement of the upper part of the chamber 2 of the check valve. The said part has stops 9 separated by passages 10 leading into the fluid outlet passage 4, the lower part of each of the stops 9 being shaped so as to present a conical or, preferably, spherical contact surface 11; the mobile sphere 5 is retained by the said stops 9 when it is in the open position. Just as in the case of the seat for the mobile sphere, this special shape has the advantage of avoiding all contact of the mobile sphere 5 with edges; this ensures exact positioning of the said sphere, which is quasi-immovable with time, guaranteeing a uniform flow of the fluid leaving the valve.

Figure 2:
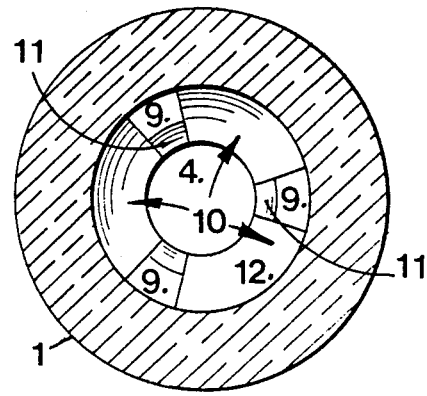
FIG. 2 is a cross-section along II—II of the check valve shown in FIG. 1.
Figure 3:
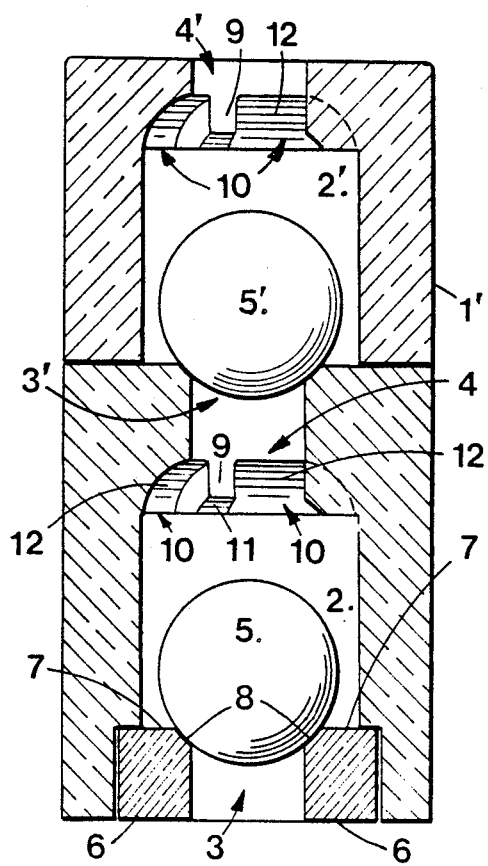
FIG. 3 illustrates, in axial section, another embodiment of the invention.

To ensure the uniformity of this flow, the stops 9 and the passages 10 which separate them will be arranged in a circular order of symmetry. In the embodiment illustrated by FIG. 2, these elements are three in number and are each separated by an angle of 120°. Other arrangements can of course be envisaged.

According to the invention, the passages 10 are shaped so as to present a fluid flow surface 12 which enables the loss of fluid pressure at the outlet passage to be minimized; fluid mechanics make it possible, in particular by calculation, to determine the optimum shape of the surface 12. In the preferred embodiment illustrated by FIG. 1, when the mobile sphere 5 rests against the stops 9 (open position), the space thereby created for the fluid to flow through is very uniform since the radius of curvature of the flow surface 12 is calculated so as to start at the center of the sphere 5 (position shown as a dotted line in FIG. 1). This shape can be determined without difficulty by calculation. A preferred embodiment of this type is thus capable of approaching laminar flow with a very substantial reduction in the turbulence and, consequently, the losses of fluid pressure caused by turbulence. This special shape also makes it possible to minimize the dead volume of the chamber 2.

Another essential characteristic of the invention is the fact that all the constituent elements of the check valve, namely the envelope 1, the mobile sphere 5 and the ring 6, are composed of a dense polycrystalline or essentially polycrystalline inorganic material and preferably of the same material, which more precisely is a ceramic. In such a case, the ceramic is dense, impermeable to liquids, gases and vapors and based essentially on alumina, zirconia, silicon carbide or titanium oxide; other technical-grade ceramics can also be used.

However, this list is not exhaustive; these products are commercially available and can be processed with the aid of the techniques conventionally used by those skilled in the art. By using such materials, the desired shapes, in particular those characteristic of the upper part of the chamber 2, can easily be reproduced, especially by moulding or forming under pressure.

This type of inorganic material also governs the techniques for fixing the ring 6 firmly to the base of the envelope 1: cementing with ceramic cement or glass cement, diffusion welding or any other appropriate method. Once welded or cemented, the ring 6 is irreversibly integral with the envelope 1. If desired, various techniques make it possible to render the external layer of the sphere 5 or that of the ring 6 monocrystalline, which further contributes towards increasing the life of the assembly.

The one-way check valve constructd in this way is therefore in the form of a module which can easily be inserted into an appropriate component. Changing the valve when it becomes worn or clogged does not require any dismantling operations such as those which one is forced to carry out with the present devices. By virtue of its inorganic (ceramic) nature, the check valve is moreover perfectly biocompatible. Furthermore, as the envelope 1 is made in a single piece, there are no problems with leaktightness here, in contrast to the situation currently encountered. During the operations for positioning the module (check valve), all risk of contamination by external dust is avoided, especially so far as the sphere 5 and the ring 6 are concerned. The reliability of an HPLC apparatus, for example, is thereby improved considerably.

A further subject of the present invention consists of a system of at least two check valves such as defined above, placed end-to-end, the fluid outlet passage 4 of the first check valve leading into the fluid inlet passage 3' of the chamber 2' of the second check valve.

In a particular embodiment of this type of system, the upper part 3 of the first check valve is shaped so as to serve as a seat for the mobile sphere 5' of the second check valve. This shape has the advantage of substantially reducing the dead volume existing in the system formed by the two modules superposed in this way. The fixing techniques which can be used here have been described above.

It is self-evident that the one-way check valve can be tailored to a large number of uses, the technique of HPLC being particularly appropriate. It can also be adapted for conveying a very wide variety of gaseous or liquid fluids.

What we claim is:

1. A one-way check valve for fluid under pressure, comprising:
    a cylindrical envelope (1) provided with a chamber (2) having a fluid inlet passage (3) at its base and a fluid outlet passage (4) at its top end,
    a mobile sphere (5) which moves inside the chamber (2), under the effect of the pressure exerted by the fluid, from a closed position to an open position or vice-versa, and
    a ring (6) firmly fixed to the base of the envelope (1) and serving as a seat for the mobile sphere (5) in the closed position, the upper part (7) of the ring (6) being shaped so as to present a spherical or conical contact surface (8),
    the upper part of the chamber (2) having stops (9) separated by passages (10) leading into the fluid outlet passage (4), the lower part of each of the stops (9) being shaped so as to present a spherical or conical contact surface (11), and the mobile sphere (5) being retained by the said stops (9) in the open position, and
    the envelope (1), the mobile sphere (5) and the ring (6) being composed, in all three cases, of a dense polycrystalline or essentially polycrystalline inorganic material.

2. The check valve as claimed in claim 1, wherein the envelope (1), the mobile sphere (5) and the ring (6) are made of ceramic.

3. The check valve as claimed in claim 2, wherein the envelope (1), the mobile sphere (5) and the ring (6) are based on alumina, zirconia, silicon carbide or titanium oxide.

4. The check valve as claimed in one of claims 1 to 3, wherein the ring (6) is welded or cemented to the base of the chamber (2).

5. The check valve as claimed in one of claims 1 to 4, wherein the passages (10) have a fluid flow surface (12) which enables the loss of pressure at the said passages to be minimized.

6. A system formed of two check valves as claimed in claim 1, placed end-to-end, the fluid outlet passage (4) of the first check valve leading into the fluid inlet passage (3') of the chamber (2') of the second check valve.

7. The system as claimed in claim 6, wherein the upper part (12) of the first check valve is shaped so as to serve as a seat for the mobile sphere (5') of the second check valve.

* * * * *